United States Patent
Mathews et al.

(10) Patent No.: US 10,082,283 B2
(45) Date of Patent: *Sep. 25, 2018

(54) APPARATUS AND METHOD FOR AMBIENT LIGHT MEASUREMENT BY A SOLID STATE LIGHT BULB

(71) Applicant: 3M INNOVATIVE PROPERTIES COMPANY, St. Paul, MN (US)

(72) Inventors: Mark G. Mathews, Oakdale, MN (US); James F. Poch, Empire, MN (US); Kayla A. McGrath, Cottage Grove, MN (US); Jake D. Swensen, Woodbury, MN (US); Blake R Shamla, Minneapolis, MN (US); James C. Medek, Shoreview, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/561,553

(22) PCT Filed: Apr. 25, 2016

(86) PCT No.: PCT/US2016/029125
§ 371 (c)(1),
(2) Date: Sep. 26, 2017

(87) PCT Pub. No.: WO2016/178843
PCT Pub. Date: Nov. 10, 2016

(65) Prior Publication Data
US 2018/0087759 A1    Mar. 29, 2018

Related U.S. Application Data

(60) Provisional application No. 62/312,595, filed on Mar. 24, 2016.

(51) Int. Cl.
*F21V 7/04* (2006.01)
*F21V 23/04* (2006.01)
(Continued)

(52) U.S. Cl.
CPC .......... *F21V 23/0464* (2013.01); *F21K 9/232* (2016.08); *F21K 9/238* (2016.08);
(Continued)

(58) Field of Classification Search
CPC .............. F21Y 2115/10; F21Y 2105/00; F21Y 2115/15; F21Y 2101/00; F21Y 2103/10;
(Continued)

(56) References Cited

U.S. PATENT DOCUMENTS 8,487,518 B2   7/2013 Johnston et al.
8,742,694 B2   6/2014 Bora et al.
(Continued)

FOREIGN PATENT DOCUMENTS

WO   WO 2010/010491   1/2010
WO   WO 2014/134637   9/2014

OTHER PUBLICATIONS

Yam, "Coextrusions for Flexible Packaging," Encyclopedia of Packaging Technology, pp. 305-309, 2009.
(Continued)

*Primary Examiner* — Thien M Le

(57) ABSTRACT

A method for a light bulb or fixture to emit light and measure ambient light. The method includes driving solid state light sources, such as LEDs, in the bulb with a cyclical signal to repeatedly turn them off and on, where the light sources are turned off and on at a rate sufficient for the bulb to appear on. The method also includes measuring ambient light via a light sensor in or on the bulb during at least some times when the light sources are off, and outputting a signal related to the measured ambient light. In some cases the light sensor
(Continued)

saturates when the solid state light sources are active and measures the ambient light level when the solid state light sources are not active. The ambient light level signal can be used to control when the light bulb is on and an intensity of light output by the bulb.

20 Claims, 7 Drawing Sheets

(51) Int. Cl.
  *F21K 9/61*     (2016.01)
  *F21K 9/232*    (2016.01)
  *H05B 37/02*    (2006.01)
  *H05B 33/08*    (2006.01)
  *F21K 9/238*    (2016.01)
  *F21V 23/00*    (2015.01)
  *F21Y 115/00*    (2016.01)
  *F21V 29/70*    (2015.01)
  *F21V 29/89*    (2015.01)
  *F21Y 115/10*    (2016.01)

(52) U.S. Cl.
  CPC .............. *F21K 9/61* (2016.08); *F21V 23/045* (2013.01); *H05B 33/0854* (2013.01); *H05B 37/0218* (2013.01); *F21V 23/003* (2013.01); *F21V 29/70* (2015.01); *F21V 29/89* (2015.01); *F21Y 2115/00* (2016.08); *F21Y 2115/10* (2016.08); *H05B 37/0272* (2013.01)

(58) Field of Classification Search
  CPC .............. F21Y 2103/33; F21Y 2113/13; F21Y 2115/00; F21Y 2115/30; F21K 9/232; F21K 9/61; F21K 9/238; F21V 23/009; F21V 23/0464; F21V 23/045; F21V 29/70; F21V 29/89; F21V 23/003
  USPC .......................................................... 362/611
  See application file for complete search history.

(56) References Cited

U.S. PATENT DOCUMENTS

| | | | |
|---|---|---|---|
| 8,967,837 B2 | 3/2015 | Tsuei et al. | |
| 9,267,674 B2 | 2/2016 | Johnston et al. | |
| 9,750,103 B2 | 8/2017 | Mathews et al. | |
| 2009/0190349 A1* | 7/2009 | Middlemass | G02B 6/4296 362/240 |
| 2011/0032708 A1* | 2/2011 | Johnston | F21V 29/004 362/294 |
| 2012/0139403 A1* | 6/2012 | Johnston | G02B 6/0085 313/46 |
| 2012/0153153 A1 | 6/2012 | Chang et al. | |
| 2012/0194054 A1* | 8/2012 | Johnston | H01J 7/24 313/46 |
| 2012/0306377 A1 | 12/2012 | Igaki et al. | |
| 2013/0063042 A1 | 3/2013 | Bora et al. | |
| 2013/0249402 A1 | 9/2013 | Bora et al. | |
| 2014/0028198 A1 | 1/2014 | Reed et al. | |
| 2014/0132158 A1 | 5/2014 | Land et al. | |
| 2014/0166850 A1 | 6/2014 | Zheng | |
| 2014/0321112 A1 | 10/2014 | Huang | |
| 2014/0346972 A1 | 11/2014 | Tran | |
| 2014/0354150 A1 | 12/2014 | Joseph et al. | |
| 2015/0260905 A1* | 9/2015 | Yuan | G02B 6/0076 362/612 |
| 2017/0210282 A1* | 7/2017 | Rodriguez Barros | B60Q 1/323 |

OTHER PUBLICATIONS

"Plastic Co-Extrusion," ThomasNet, pp. 1-2, 2009.
International Search Report for PCT International Application No. PCT/US2016/029125, dated Aug. 29, 2016, 3 pages.

* cited by examiner

US 10,082,283 B2

APPARATUS AND METHOD FOR AMBIENT LIGHT MEASUREMENT BY A SOLID STATE LIGHT BULB

CROSS REFERENCE TO RELATED APPLICATIONS

This application is a national stage filing under 35 U.S.C. 371 of PCT/US2016/029125, filed Apr. 25, 2016, which claims the benefit of U.S. Provisional Application No. 62/312,595, filed Mar. 24, 2016, the disclosures of which are incorporated by reference in their entireties herein.

BACKGROUND

Recent energy standards and regulations have been introduced in an attempt to reduce energy consumption by lighting. One common method is to reduce lighting levels when rooms are not occupied, typically achieved through the use of lighting control system with a motion sensor. Others methods include using active sensing to adjust lighting levels to compensate for light from natural and other sources, or using timers to reduce lighting levels during specific periods during the day.

Ambient light sensing systems typically use an external light sensor to measure light from natural sources and then determine the amount of overhead lighting needed to maintain predetermined or pre-programmed light levels. This sensor can either be wireless or wired into a lighting control system, but it is rarely ever incorporated into a bulb. If so, it has a shield to block the light sensor from the compensatory light source. The reason for this lies in the driver electronics; most modern lighting electronics output a very high frequency (greater than 10 kHz) or a near-constant DC voltage to maximize the period during with the light source emits light. This is especially true in light emitting diode (LED)-based bulbs. Any light sensor in the bulb, unless implemented with very fast controls or physically blocked from the compensatory light source, will be overwhelmed by the light output of the bulb itself and will likely not be able to accurately measure ambient light from other sources. Accordingly, a need exists for more effective ways to measure ambient light for controlling light sources.

SUMMARY

A first method for a light fixture to emit light and measure ambient light, consistent with the present invention, includes driving a solid state light source in the light fixture with a cyclical signal to repeatedly turn the light source off and on, where the light source is turned off and on at a rate sufficient for the light fixture to appear on. The method also includes measuring ambient light via a light sensor in or on the light fixture during at least some times when the light source is off, and outputting a signal related to the measured ambient light level.

A second method for a light fixture to emit light and measure ambient light, consistent with the present invention, includes driving a solid state light source in the light fixture with a cyclical signal to repeatedly turn the light source off and on, where the light source is turned off and on at a rate sufficient for the light fixture to appear on. The method also includes measuring ambient light via a light sensor in or on the light fixture during at least some times when the light source is off, and outputting a signal related to the measured ambient light level. The light sensor saturates when the solid state light source is active and measures the ambient light level when the solid state light source is not active.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Embodiments of this invention include a method for a smart solid state light bulb or fixture to accurately measure ambient light. This measurement is achieved through bulb construction and by the use of a photodiode or other optical sensor to measure ambient light during a brief period when the light bulb does not emit any light. Examples of solid state light bulbs are described in U.S. Pat. Nos. 8,487,518; 8,967,837; and 9,267,674, all of which are incorporated herein by reference as if fully set forth. The term "bulb" is used to refer to a light fixture whether having a bulb shape or other shape. An example of a method for ambient light measurement by a solid state light is disclosed in U.S. patent application Ser. No. 14/701,886, entitled "Apparatus and Method for Ambient Light Measurement by a Solid State Light Bulb," and filed May 1, 2015, which is incorporated herein by reference as if fully set forth.

Figure 1:
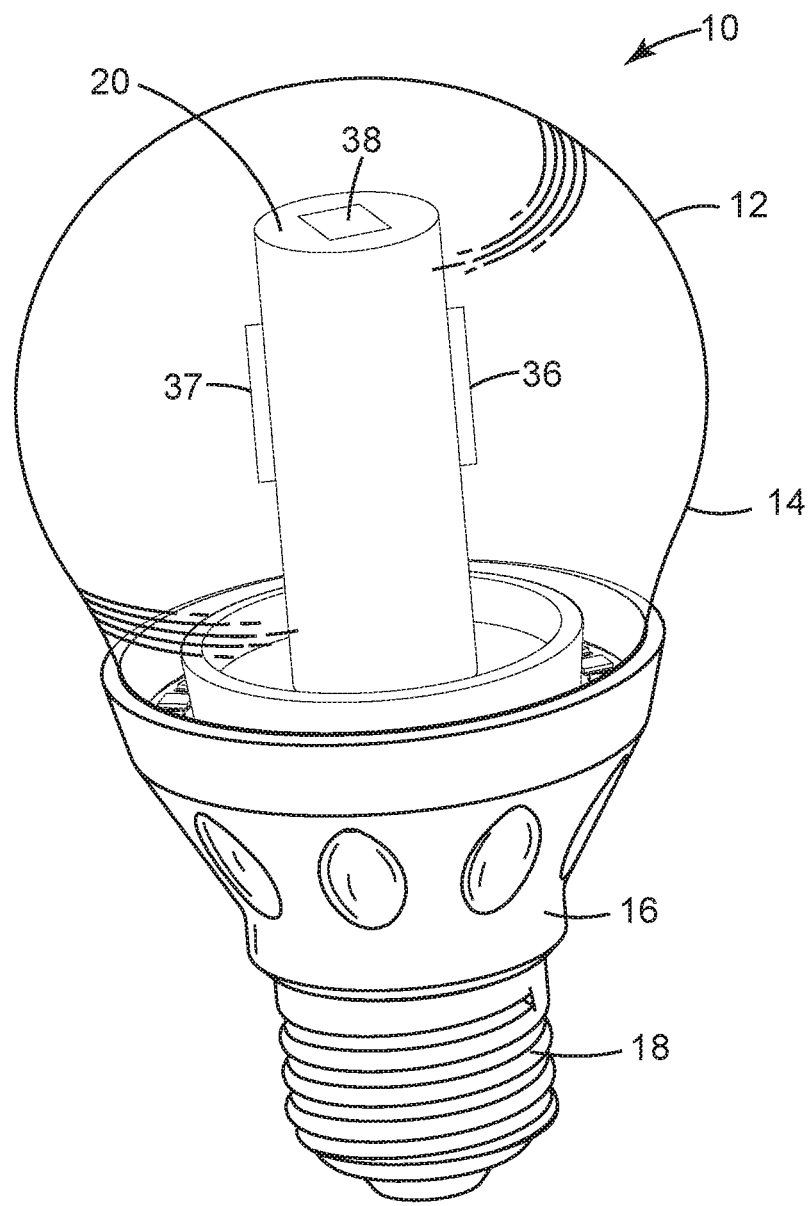
FIG. 1 is a perspective view of a solid state light with light sensors, as assembled.
Figure 2:
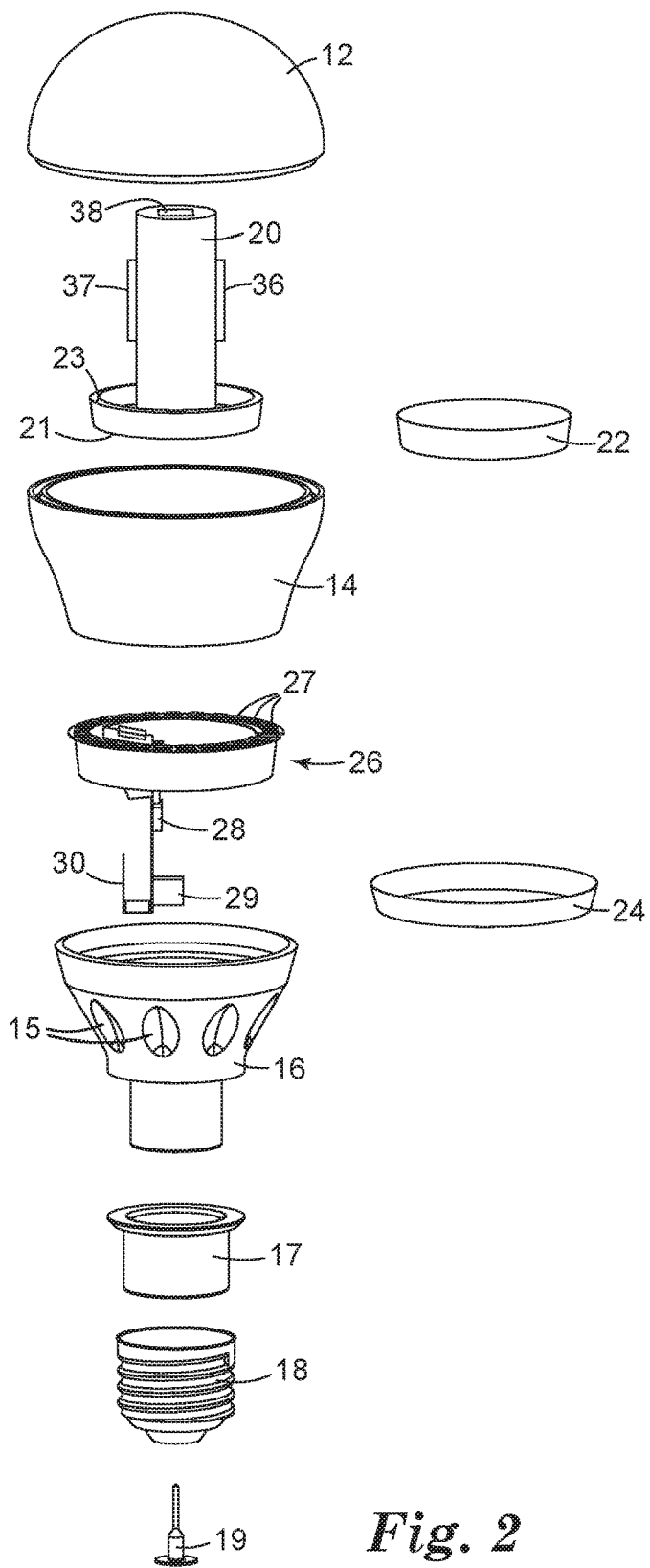
FIG. 2 is an exploded perspective view of the solid state light.
Figure 3:
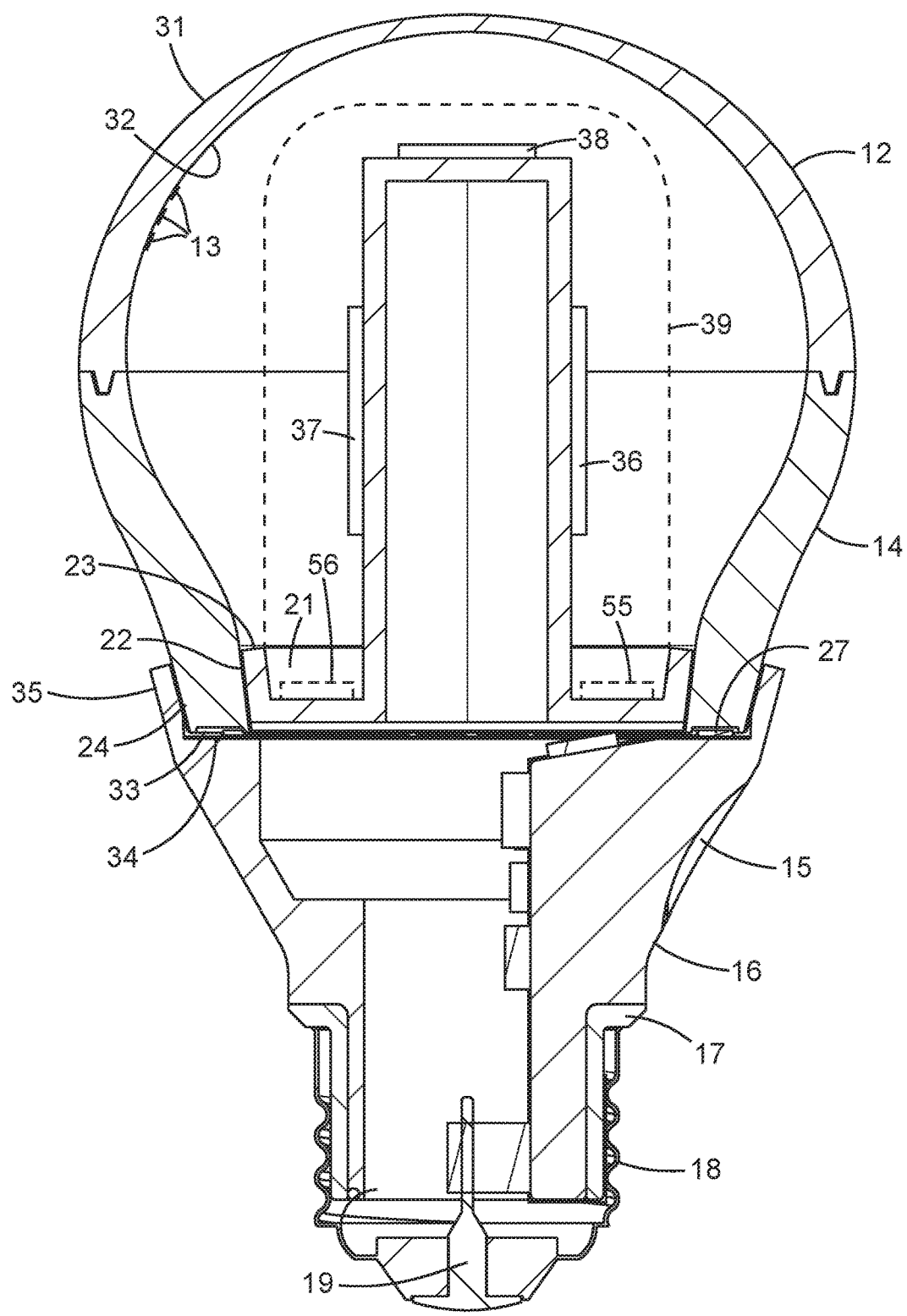
FIG. 3 is a side sectional view of the solid state light.

FIG. 1 is a perspective view of a solid state light 10 with light sensors, as assembled. FIGS. 2 and 3 are exploded perspective and side sectional views, respectively, of solid state light 10. Light 10 includes a light guide having an upper portion 12 and a lower portion 14, a light section 16, a base 18, and a thermal guide 20. The light guide has an outer surface 31 and an inner surface 32 forming an enclosed interior volume, meaning the light guide has no apertures (vents) allowing passage of air through the light guide to the interior volume. Alternatively, the interior volume can be not enclosed, meaning the light guide has one or more apertures (vents) allowing for passage of air from outside the bulb into the interior volume. The outer and inner surfaces 31 and 32 form an edge 33. Inner surface 32 can optionally have light extraction features, as represented by features 13, in order to provide for a uniform or particular light distribution from the light guide. Light extraction features 13 can include, for example, a printed pattern of dots or other shapes on inner surface 32. Providing light extraction features 13 on only inner surface 32 can provide light 10 with a smooth appearance and feel on outer surface 31 of the light guide. The light guide can be implemented with acrylic or polycarbonate, for example.

A circuit board 26 includes a plurality of solid state light sources 27, a driver circuit 28 such as an integrated circuit chip, a connector 29, and a neutral connector 30. Light sources 27 are located at an edge, for example edge 33, of the light guide formed by outer and inner surfaces 31 and 32 in order to optically couple light into the light guide. The light is transported in the light guide, for example by total internal reflection, until the light is extracted from outer surface 31, inner surface 32, or both. Connector 29 is electrically connected with a pin 19 in order to receive power from a power source such as a light socket. Neutral connector 30, optionally with a neutral clip, is electrically connected with base 18. Solid state light sources 27 can be implemented with LEDs or organic light emitting diodes (OLEDs), for example.

Light section 16 includes a ridge 34 for supporting light sources 27 and a portion 35 for supporting outer surface 31 of the light guide adjacent edge 33. In some embodiments, there is no air gap between edge 33 and light sources 27. For example, edge 33 can be placed directly against light sources 27, or an optical adhesive can be between edge 33 and light sources 27. Reflective rings 22 and 24 can be located adjacent light sources 27 and on opposite sides of them in order to help couple light from light sources 27 into the light guide. Reflective rings 22 and 24 can be implemented with a reflective film. An example of a reflective film is the Enhanced Specular Reflective (ESR) film product from 3M Company, St. Paul, Minn. An insulator 17 is located between light section 16 and base 18. In some embodiments, light section 16 has no apertures (vents) between the light guide and base 18 (see FIG. 1). Light section 16 can optionally include decorative facets or indentations 15 on its exterior surface. Light section 16 can be implemented with metal (for example, aluminum) or ceramic.

Thermal guide 20 is at least partially contained within the interior volume of the light guide for providing thermal conduction from the light sources 27 for cooling the light. Thermal guide 20 has a base 21 for placement within light section 16 and a portion 23. Thermal guide 20 can extend by varying or different amounts into the interior volume of the light guide, for example it can extend only slightly into the interior volume or extend nearly through the interior volume or extend by other amounts. The thermal guide can have mechanical interference with the light guide to hold the light guide on light section 16. In particular, portion 23 can be angled slightly toward the light guide in order to hold the light guide in place against portion 35 of light section 16. In some embodiments, portions 23 and 35 may have ribs or protrusions to maintain a slight gap between light guide lower portion 14 and reflective rings 22 and 24. Alternatively, ribs or protrusions can be placed on surfaces 31 and 32 to maintain a slight air gap between light guide lower portion 14 and reflective rings 22 and 24. Thermal guide 20 can optionally enclose the interior volume of the light guide between the light guide and light section 16, in which case the interior volume is fully enclosed to prevent passage of air (and moisture or particulate) from outside the light into the interior volume. For example, base 21 along with the post extending into the interior volume of the light guide can both be implemented without apertures (vents), and base 21 can provide for a perimeter seal against inner surface 32 of the light guide. An air gap is formed between at least a portion of thermal guide 20 and inner surface 32 the light guide. In some embodiments, the air gap substantially surrounds thermal guide 20 between thermal guide 20 and inner surface 32 of the light guide as shown.

As an alternative to a light guide, light 10 can be implemented with a diffuser for components 12 and 14. When using a diffuser, the light sources can be located within the interior volume instead of at the edge of the diffuser, as illustrated by light sources 55 and 56 such as LEDs (see FIG. 3). As another alternative, light 10 can use a light guide as components 12 and 14 along with light sources located both at the edge of the light guide (light sources 27) and within the interior volume (light sources 55 and 56). Also, aside from solid state light sources, light 10 can be implemented with other light sources such as A19 replacement bulbs, BR30 bulbs, T8 tubes, LED troffers, or other light sources.

As shown in FIGS. 1-3, light 10 includes light sensors 36 and 37 on opposing sides of thermal guide 20 and an optional antenna 38 on the top of thermal guide 20. Light sensors 36 and 37 are used to measure ambient light in the vicinity of light 10. Two light sensors 36 and 37 are shown for measuring ambient light on both sides of light 10. Alternatively, only one light sensor can be used. Light sensors 36 and 37, and optional antenna 38, would have an electrical connection with a microcontroller as described below. An optional translucent or transparent cover 39 (see FIG. 3) over ambient light sensors 36 and 37 can provide protection for the sensors. Cover 39 can also serve as an RF-transparent medium for a wireless signal to enter the bulb, if the bulb uses wireless control. Although light sensors 36 and 37 are shown mounted on thermal guide 20, they can alternatively be mounted on a different component inside the light guide and separate from the thermal guide, or the light sensor can be mounted on the bulb outside of the light guide.

Figure 4:
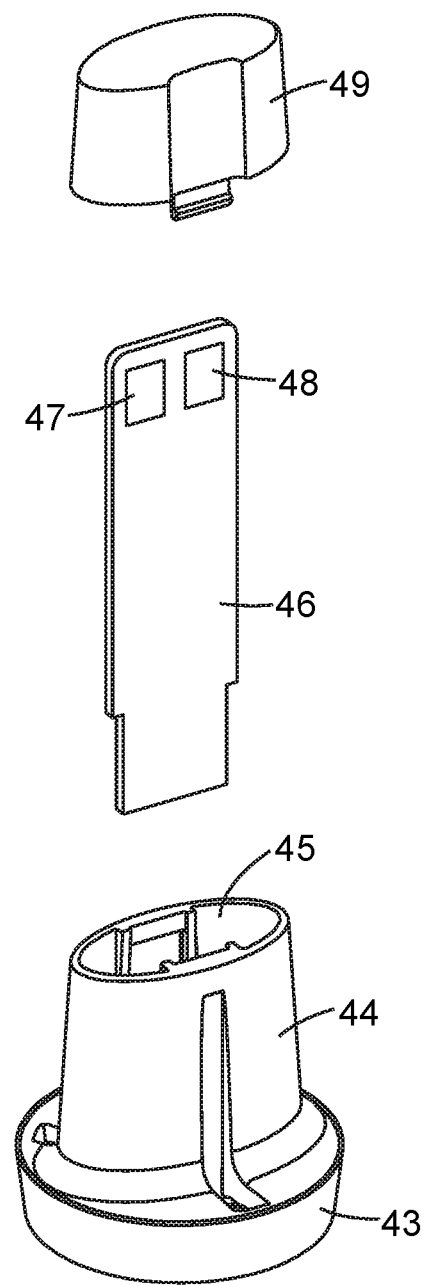
FIG. 4 is an exploded perspective view of another embodiment of a thermal guide for the solid state light.

FIG. 4 is an exploded perspective view of another embodiment of the thermal guide. This embodiment includes a thermal guide 44 that can be implemented with metal, for example aluminum, for dissipating heat from light sources 27. Thermal guide 44 includes a reflective film 43, such as the ESR film product, at its base and which is positioned adjacent light sources 27 when thermal guide 44 is mounted on light section 16. Reflective film 43 and reflective rings 22 and 24 are optional, and light 10 can alternatively include only one of those reflective components or none of them. Thermal guide includes an inner slot 45 that can accommodate a circuit board 46, which is electrically coupled to circuit board 26 and driver 28 when installed in slot 45. A light sensor 47 and an optional antenna 48 are mounted near the end of circuit board 46, and another light sensor can be mounted on a side of circuit board 46 opposite light sensor 47. A transparent or translucent cover 49, implemented with plastic for example, is mounted on the open end of thermal guide 44 opposite the base and over light sensor 47 and optional antenna 48. When circuit board 46 is installed in thermal guide 44, light sensor 47 and optional antenna 48 would be located beyond the end of thermal guide 44 and behind cover 49.

Figure 5:
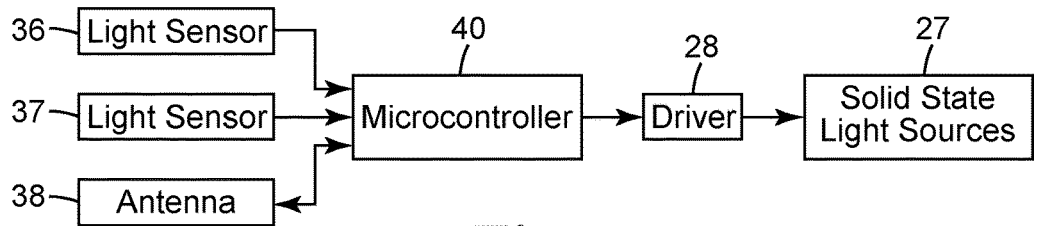
FIG. 5 is a block diagram of the light bulb driver and light measurement component.

FIG. 5 is a block diagram of the light bulb driver and light measurement component. Light sensors 36 and 37 are electrically coupled to a microcontroller 40 for measuring ambient light. Antenna 38, when implemented in the bulb, is also electrically coupled to microcontroller 40 for sending and receiving signals to and from other such smart light bulbs using, for example, a wireless communication protocol such as the BLUETOOTH technology or the ZIGBEE specification.

Microcontroller 40 is electrically coupled to driver 28 to provide a signal for controlling a light output of light 10. Driver 28 is electrically coupled to solid state light sources 27. As an alternative to a microcontroller, the light sensor can be used in an analog circuit to control the light sources. When thermal guide 44 is used, microcontroller 40 can be mounted on circuit board 46. Otherwise, microcontroller 44 can be located elsewhere within light 10.

Light 10 uses a driver that switches in sequential strings of LEDs as more voltage becomes available in a rectified AC waveform. The levels at which the strings are introduced into the active circuit can be adjusted, but for a North American 60 Hz 120 VAC system, the first string of LEDs can be, for example, switched on at slightly above 30 VDC. No light is emitted from the bulb when the voltage at the driver is less than 30 VDC. With a waveform of 120 Hz and turn on of 30 VAC, this results in a "dead time" of roughly 900 microseconds when the LEDs are not on and thus not outputting light. This dead time can be varied and, although shown as less than one millisecond, the dead time can be greater than one millisecond.

Figure 6:
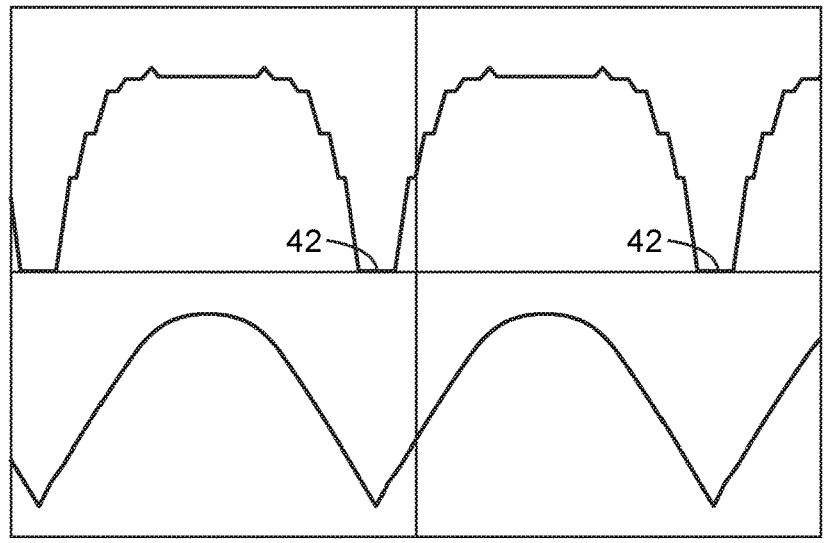
FIG. 6 is a waveform of a rectified voltage and the LED driver current.

FIG. 6 is a waveform of such an exemplary driver signal for both the rectified voltage waveform and the LED driver current, illustrating this period of zero current between cycles, for example period 42. In FIG. 6, the bottom line represents the rectified voltage waveform, and the top line represents the LED driver current. A phototransistor or fast optical sensor can be used as the light sensor to measure ambient light entering the bulb during this dead time (period of zero current). Even though light 10 is driven with a cyclical or pulsating signal to repeatedly turn the light sources off and on, they are turned off and on at a rate sufficient for the bulb to appear on, meaning without the appearance of flashing light to a human observer. The cyclical or pulsed signal can use the same repeating cycle or pulse, or used varying cycles or pulses, to turn the LEDs off and on.

Figure 7:
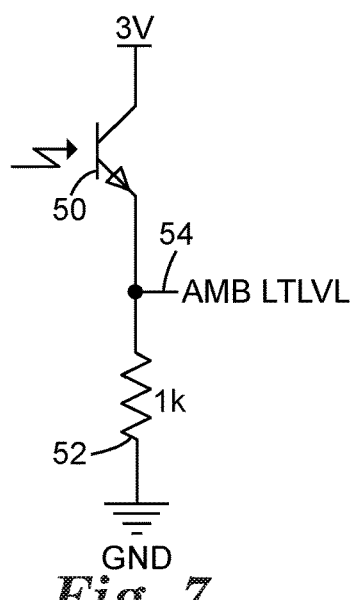
FIG. 7 is circuit diagram of the light measurement component.

FIG. 7 is circuit diagram of the light measurement component showing an example of a phototransistor 50 used as the light sensor. Phototransistor 50 is coupled in series with a resistor 52. The AMB LTL VL signal at terminal 54 is a voltage representation of the amount of light received by the light sensor, providing a signal relating to the ambient light level. In the circuit, the voltage of 3 V and resistance of 1 kΩ are provided for exemplary purposes only for a particular embodiment; other voltage and resistance values can be used depending upon, for example, a particular implementation of the light sensor circuit.

As this method uses a consistent dead time in the voltage cycle to measure the amount of ambient light rather than an arbitrary dead period determined by a timer, every light bulb using this method installed on the same AC phase will measure light at exactly the same time, when no light is emitted from any similar bulb with no need for a communication link among the bulbs. This ensures that the light measured by the light sensor is actually light produced by other light sources, including other electronics and natural sources, rather than the total light produced by all sources within an area. This is necessary for true ambient light measurement. Similarly, the light sensor can be used during full light output to determine the light output of the bulb for self-diagnostics and active feedback.

The AMB LTL VL signal is sent to microcontroller 40 for data processing. If the light level sensed a specific series of light pulses (which is near the sensor maximum output), it is considered to be communication data instead of ambient light data. The light can then darken (turn off the light sources) and allow for an increased data rate for receiving the communication data.

The current through the LED strings is zero for approximately 1 millisecond every 8.3 milliseconds. During this 1 millisecond time, the sensors can react to external light sources such as computer screens, natural lighting, and mobile devices, since no light is emitted from the bulb. A mobile device with a light source placed near the outside of the light guide of light 10 can influence the light level readings of the light sensors. Modulating the light emitted by the mobile device in specific patterns can then be used to transfer data from the device to the bulb. The mobile device can be, for example, a phone, tablet, or handheld flashlight. Alternatively, a non-mobile light source can be used and can possibly transmit light to several light bulbs at once for programming them.

Figure 8:
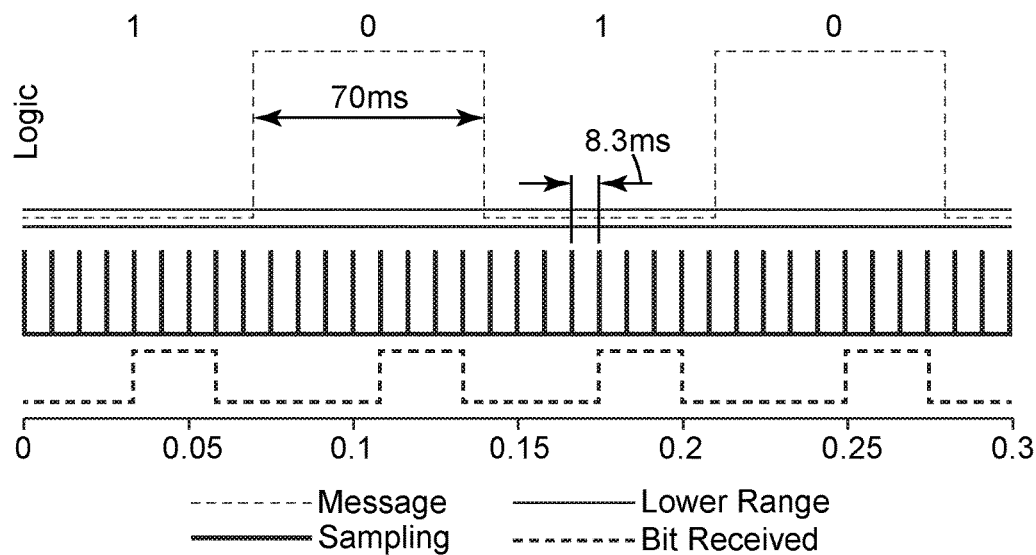
FIG. 8 is a diagram of a communication scheme for programming a light bulb via a light sensor.

Using one or more light sensors, reception of light level shifting data can be accomplished with direct line of sight. Light sensors will output a value corresponding to the current light surroundings, which includes the ambient light level and communication data. To separate the two data sets in the system, a moving average value and current value of the sensor(s) are tracked. When the current value changes drastically (the exact value being configurable) compared to the average value and is above the defined sensor threshold, the data is considered communication instead of ambient light level. A value meeting these characteristics is considered a binary 1, and when the value drops back to the average ambient light level it is considered a binary 0. FIG. 8 illustrates the physical method by which the bulb may decipher the transmitted light. Samples are taken from the light sensors at 120 Hz during the dead time in which the bulb is emitting no light for all the time if the light is off. The light logic level shown in FIG. 8 is exaggerated to illustrate the method.

The data nibbles received by the system could be encoded from 4-bit nibbles to 5-bit nibbles. The conversion table is shown by Table 1. Additionally, start of data and end of data representations have been added to aid in the data synchronization process.

TABLE 1

Light Level Shifting Communication Encodings

| Decoded Hexadecimal Nibble | Encoded Binary Nibble | Communication Scheme Representation |
| --- | --- | --- |
| 0 | 0b11110 | Data 0 |
| 1 | 0b01001 | Data 1 |
| 2 | 0b10100 | Data 2 |
| 3 | 0b10101 | Data 3 |
| 4 | 0b01010 | Data 4 |
| 5 | 0b01011 | Data 5 |
| 6 | 0b01110 | Data 6 |
| 7 | 0b01111 | Data 7 |
| 8 | 0b10010 | Data 8 |
| 9 | 0b10011 | Data 9 |
| A | 0b10110 | Data A |
| B | 0b10111 | Data B |
| C | 0b11010 | Data C |
| D | 0b11011 | Data D |
| E | 0b11101 | Data E |
| F | 0b11101 | Data F |
| | 0b11111 | Com Idle |
| | 0b11000 | Com SOD (Part 1) |
| | 0b10001 | Com SOD (Part 2) |
| | 0b01101 | Com EOD (Part 1) |
| | 0b00111 | Com EOD (Part 2) |

In order to determine a bit, the level of the sensor can be sampled five times. To confirm a valid bit, three consecutive samples must be at the same level representing the bit. In the system, this means that the communication frequency is approximately 24 Hz/bit due to a sample being taken every 120 Hz, which is a limitation of the non-isolated driver.

To begin light level shifting communication to the system, the transmitting device must alternate between binary 0 and 1 at the communication frequency for one 10-bit byte. This allows the system to synchronize data. This synchronization pattern is immediately followed by both parts of the start of data (SOD) command. Any amount of data can follow the SOD command, but it must be terminated with the end of data (EOD) command.

There is potential to turn off the LED light string and switch to a higher communication rate after the SOD command is received. This high data rate can only be achieved after the SOD command. If it were to immediately follow the synchronization pattern, any light source strobing at 24 Hz would cause the LED light string to turn off in expectation of data communication.

The protocol packet includes two types of fields, mandatory and conditional. The mandatory fields are the command code and CRC. The conditional fields are only implemented in some commands. The conditional fields will be described in the detailed section of each command. When a conditional field is not used, it will be absent from the command being sent. All messages in the system contain the structure shown in Table 2

TABLE 2

System Packet Structure

| Field | Length | Description |
| --- | --- | --- |
| Command Code | 1 Byte | This is a unique identifier for the task to be performed. |
| Conditional Fields | Variable | This field varies in length depending on the command. There may not be any additional data for some commands. |
| CRC | 2 Bytes | A calculated checksum based on all fields. |

There is only one type of command in the system, action commands. Action commands are requests for execution of different routines within the light bulb. Action commands have no specific return command, only a general return commands "Acknowledged" and "Not Acknowledged" for completion status.

Any error in communication between the transmitting device and receiving device are handled in one of two methods. No indication is produced by the receiving device if the receiving device does not receive a start of data command. Should an error occur after a start of data command, the receiving device will remain off until the message timeout expires, flashing once to indicate an error to the user.

Numeric data (unique identification numbers, unsigned numbers greater than 255, and the like) in the system are transmitted and received in the Big-Endian format. This means the most significant byte (MSB) will be transmitted first. When reading a number in this document, the leftmost value is the MSB. As an example, consider transmission of decimal value 500, which is equivalent to hexadecimal 0x01F4. The transmission of this number takes 2 bytes: 0x01, 0xF4.

Table 3 provides a full list of commands along with the corresponding description and command code.

TABLE 3

Command List

| Command Name | Description | Command Code |
| --- | --- | --- |
| Set State | Set the state of the bulb | 0x01 |
| Set Output | Set light output of bulb | 0x02 |
| Set Max Output | Set maximum light output of bulb | 0x03 |
| Set Min Output | Set minimum light output of bulb | 0x04 |
| Set Color | Set light color of bulb | 0x05 |
| Set Thresholds | Set the ambient thresholds and light output levels | 0x10 |
| Set Upper Threshold | Set the upper ambient threshold and light output levels | 0x11 |
| Set Lower Threshold | Set the lower ambient threshold and light output levels | 0x12 |
| Adjust Upper Light | Increase/decrease upper light output level by set amount | 0x13 |
| Adjust Lower Light | Increase/decrease lower light output level by set amount | 0x14 |
| Adjust Ambient Slope | Increase/decrease light output level by set amount | 0x15 |
| Set Color Threshold | Set the light color in accordance with the ambient thresholds | 0x16 |
| Set Upper Color Threshold | Set the upper light color in accordance with the ambient threshold | 0x17 |
| Set Lower Color Threshold | Set the lower light color in accordance with the ambient threshold | 0x18 |
| Adjust Upper Color | Increase/decrease the upper light color | 0x19 |
| Adjust Lower Color | Increase/decrease the lower light color | 0x1A |
| Set Schedule Time | Set the current time information | 0x30 |
| Set Schedule Event | Add event to schedule | 0x31 |
| Set Simple Schedule | Set times for bulb to turn on and off | 0x32 |
| Clear Schedule | Clear all schedule events and time | 0x3F |
| Set Factory Defaults | Return to factory default settings | 0x81 |
| Acknowledged | Acknowledge the reception of a command | 0x85 |
| Not Acknowledged | Reception of a command was interrupted | 0x8F |

Figure 9:
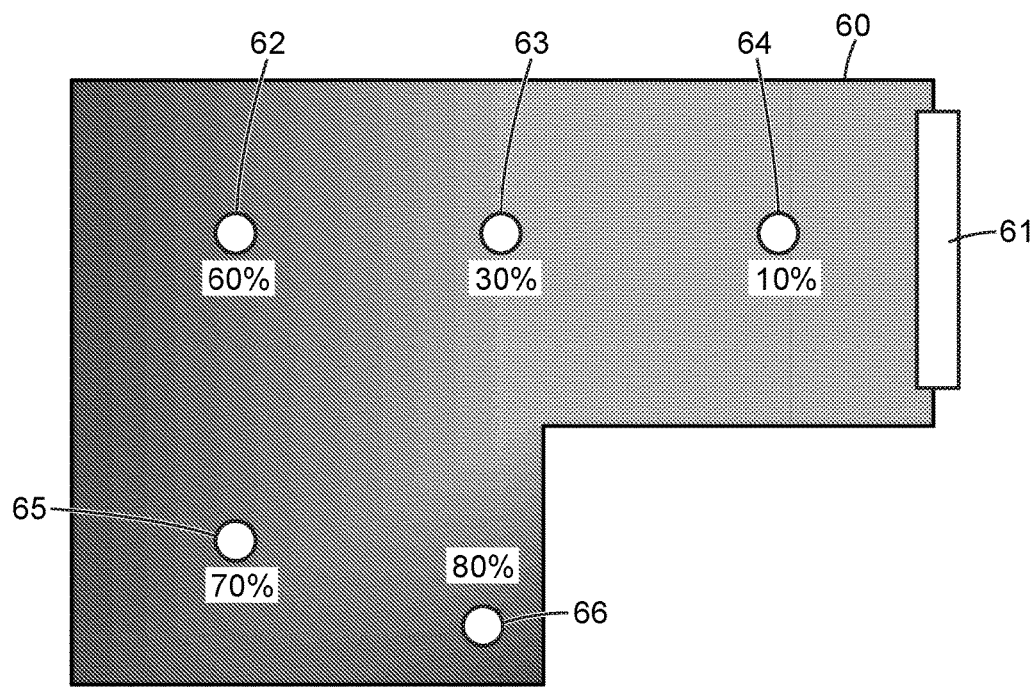
FIG. 9 is a diagram of using multiple smart light bulbs for zone control of lighting with independent control and no need for a communication link among the bulbs.

Individual ambient light control allows for light levels to be adjusted in different parts of the same room, where light from other sources may be blocked by walls or other objects. In the example shown in FIG. 9 for a room 60, four overhead lights 62, 63, 64, and 65, and one floor lamp 66, receive different amounts of light from a window 61, and each light bulb can vary its light output (the "%" level in FIG. 9) to match their received light levels (represented by the shading level), something not achievable with a single, standalone light sensor.

Group ambient light control or total room control can be achieved with smart LED bulbs that can make individual measurements and communicate with each other via their antennas using a wireless communication protocol. These groups could be easily modified in software to add more or fewer bulbs to a zone. For example, a user may create a group of bulbs in a room near a window, a second group of bulbs further away from the window, and a third group of bulbs in an area of the room that receives little natural light.

Using the programming method above, the light bulbs can be configured for variety of modes. For example, the light bulb can be programmed to turn on and off at preset times, turn on an off at random times when a resident is away on vacation, turn off when ambient light reaches a preset level, or turn on and off based upon other criteria.

Figure 10:
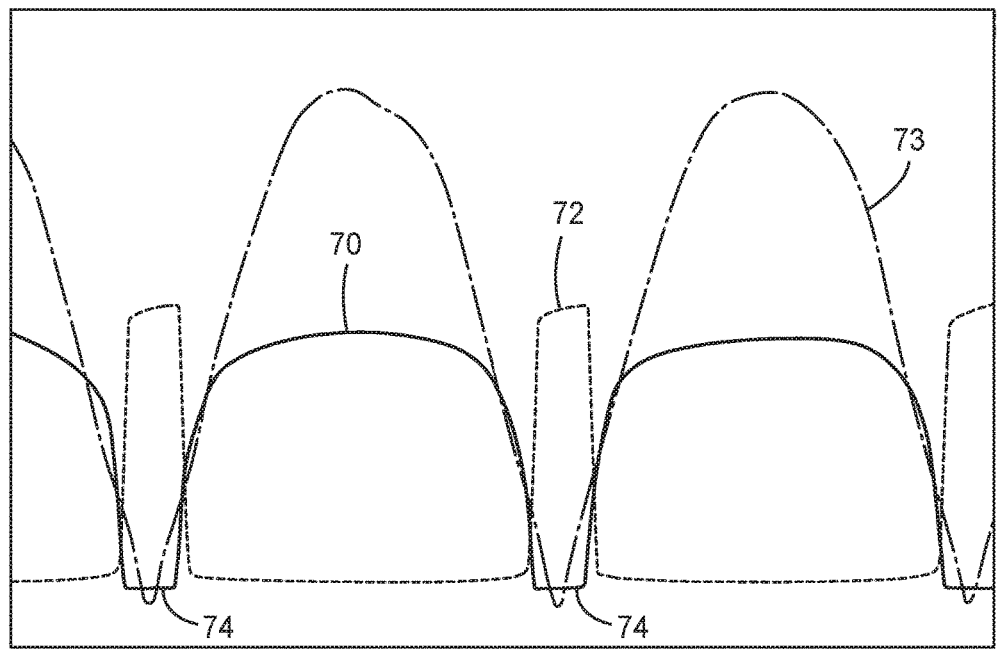
FIG. 10 is a waveform of light sensor output and LED current for an alternate embodiment.
Figure 11:
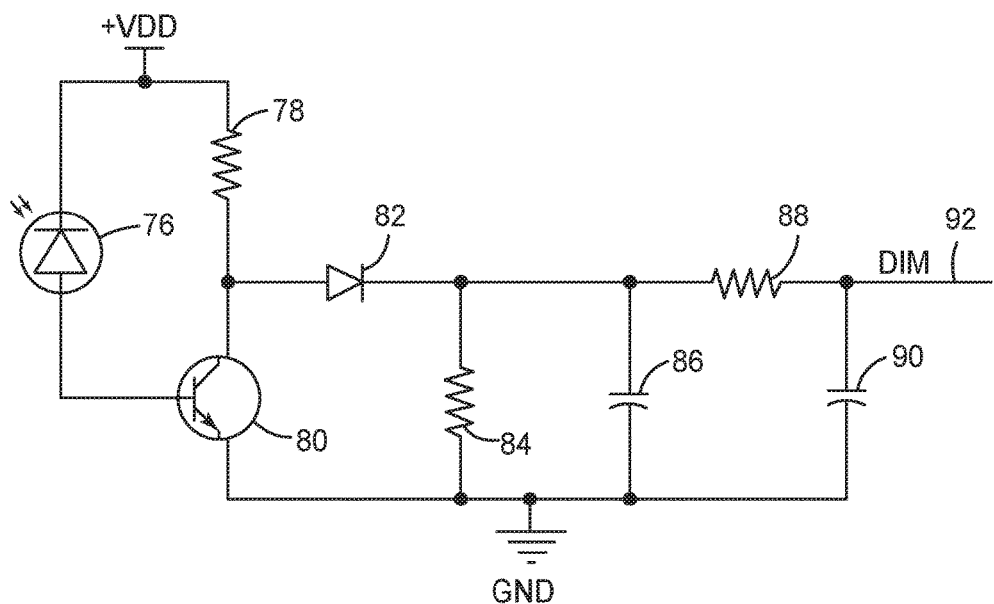
FIG. 11 is a circuit diagram of light sensor, peak detector, and filter for the alternate embodiment.

FIG. 10 is a waveform of light sensor output and LED current for an alternate embodiment, and FIG. 11 is a diagram of a sensor circuit for this alternate embodiment. FIG. 10 shows the LED current for this embodiment as represented by line 70, the output (voltage) of a light sensor circuit as represented by line 72, and the rectified LED driver input voltage as represented by line 73. The signals 70, 72, and 73 are shown superimposed, although each signal has its own individual scale. In an exemplary embodiment, the LED current 70 can range from 0 to a preset value such as about 70 mA, the output 72 of the light sensor circuit can range from 0 to VDD, and the rectified driver input voltage 73 is 170 VDC (maximum).

As shown in FIG. 10, the output from the sensor circuit in this example is highest during the period when no light is emitted from the bulb, for example periods 74. In this alternate embodiment, the sensor circuit is designed such that the light sensor saturates at high illumination levels producing a very low, near-zero voltage, while the sensor circuit is still able to detect light levels below a certain level, around 5 klux in this example, to produce a full zero-to-VDD voltage swing.

The maximum light sensor voltage during these off periods (74) is the level of ambient light received by the light sensor and thus the ambient light in the vicinity of the bulb. Very low ambient light levels (e.g., a completely dark area) will cause the light sensor voltage to be very high, whereas high ambient light levels (e.g., a sun-lit area) will produce low voltages. Thus, the output of the light sensor can be connected through a peak detection circuit and filter to the gate or base of a transistor, as shown in the circuit of FIG. 11, to control the light output of a light source; lower ambient light levels will cause the light source to emit more light, and higher ambient light levels will cause the source to emit less light.

Alternatively, rather than the ambient light level being inversely proportional to the light sensor output voltage, the sensor circuit can be modified so that the ambient light level is directly proportional to the output voltage where higher ambient light levels would result in a higher output voltage.

In order for this method to work, the sensor must be placed in the light fixture in such a way that the light sensor becomes saturated by the light produced by the light fixture and can still distinguish changes in light levels from light produced outside of the light fixture. Hence, the sensor ideally must be placed near the LED emitters and near a window, cavity, or hole in the light fixture that allows ambient light to reach the light sensor.

FIG. 11 is an exemplary circuit diagram for implementing the sensor circuit for this alternate embodiment. This circuit includes a light sensor circuit (a photodiode 76 coupled to a resistor 78 and a transistor 80), a peak detector (a diode 82 coupled to a resistor 84), and a filter (a resistor 88 coupled between capacitors 86 and 90). The following are exemplary values for the components of the sensor circuit, although the values can vary based upon a particular application: resistor 78—100 kΩ; resistor 84—1 MΩ; resistor 88—100 kΩ; capacitor 86—0.1 uF; and capacitor 90—2.2 uF. In this exemplary sensor circuit, the VDD and DIM signals can range from 0 to 5 V.

Photodiode 76 is used in this circuit in order to provide fast rise and fall times to respond to the changes in light output from the bulb. A phototransistor may not be able to respond quickly to the large range in light output from the period when the LEDs are on to the period when the LEDs are off and only ambient light is available. Any similar photosensor could be used provided it has a fast enough response time. The output of the circuit is a DIM signal on line 92, which could be coupled to the LED driver to control the light output by the bulb, for example driver 28 coupled to solid state light sources 27.

This circuit can be modified in many ways to improve the performance, speed, or accuracy of the ambient light measurement. A microcontroller, such as microcontroller 40, or analog-to-digital converter could take a measurement of the voltage from the photosensor at any time to determine the ambient light level rather than using a diode and a filter. If a microcontroller is used in this alternate embodiment, then the DIM signal can be sent to the microcontroller for data processing. If the light level sensed a specific series of light pulses, it can be considered to be communication data instead of ambient light data. The light can then darken (turn off the light sources) and allow for an increased data rate for receiving the communication data, for example the communication data with the corresponding protocol received from a mobile device as described above.

The circuit of FIG. 11 can be incorporated into bulb 10, for example, where light sources 27 in bulb 10 are driven using the waveform of FIG. 10. The light sensor, and possibly the circuit of FIG. 11, can be mounted on thermal guide 20 as represented by light sensors 36 and 37.

The invention claimed is:

1. A light fixture with an ambient light sensor, comprising:
a solid state light source;
a light section having a first side and a second side opposite the first side;
a light guide, coupled to the second side of the light section, comprising a material having a first surface and a second surface opposite the first surface and an edge between the first and second surfaces, wherein the second surface forms an interior volume, the light is transported within the light guide until the light exits from the first or second surface, wherein the solid state light source is located at the edge of the light guide in order to optically couple the light into the light guide at the edge;
a thermal guide at least partially contained within the interior volume and integrated with the light guide for providing thermal conduction from the light source for cooling the light, wherein an air gap is formed between at least a portion of the thermal guide and the second surface of the light guide, wherein the thermal guide includes a post extending into the interior volume;
a light sensor located within the interior volume of the light guide;
a driver for providing power to the solid state light source, wherein the driver is configured to drive the solid state light source with a cyclical signal to repeatedly turn the solid state light source off and on, wherein the solid state light source is turned off and on at a rate sufficient for the light fixture to appear on,
wherein the light sensor outputs a signal related to an ambient light level when the solid state light source is off; and
further comprising an antenna mounted on the post.

2. The light fixture of claim 1, wherein the air gap substantially surrounds the thermal guide between the thermal guide and the second surface of the light guide.

3. The light fixture of claim 1, wherein the light sensor is mounted on the post.

4. The light fixture of claim 1, further comprising a transparent or translucent cover over the light sensor.

5. The light fixture of claim 1, wherein the interior volume is enclosed.

6. The light fixture of claim 5, wherein the enclosed interior volume is enclosed between the light guide and the light section.

7. A light fixture with an ambient light sensor, comprising:
a solid state light source;
a light section having a first side and a second side opposite the first side;
a light guide, coupled to the second side of the light section, comprising a material having a first surface and a second surface opposite the first surface and an edge between the first and second surfaces, wherein the second surface forms an interior volume, the light is transported within the light guide until the light exits from the first or second surface, wherein the solid state light source is located at the edge of the light guide in order to optically couple the light into the light guide at the edge;
a thermal guide at least partially contained within the interior volume and integrated with the light guide for providing thermal conduction from the light source for cooling the light, wherein an air gap is formed between at least a portion of the thermal guide and the second surface of the light guide, wherein the thermal guide includes a post extending into the interior volume;
a light sensor located within the interior volume of the light guide;
a driver for providing power to the solid state light source, wherein the driver is configured to drive the solid state light source with a cyclical signal to repeatedly turn the solid state light source off and on, wherein the solid state light source is turned off and on at a rate sufficient for the light fixture to appear on,
wherein the light sensor outputs a signal related to an ambient light level when the solid state light source is off; and
further comprising a circuit board located at least partially within the post, wherein the light sensor is mounted on the circuit board.

8. The light fixture of claim 7, further comprising an antenna mounted on the circuit board.

9. The light fixture of claim 7, wherein the air gap substantially surrounds the thermal guide between the thermal guide and the second surface of the light guide.

10. The light fixture of claim 7, further comprising a transparent or translucent cover over the light sensor.

11. The light fixture of claim 7, wherein the interior volume is enclosed.

12. A light fixture with an ambient light sensor, comprising:
a solid state light source;
a light section having a first side and a second side opposite the first side;
a light guide, coupled to the second side of the light section, comprising a material having a first surface and a second surface opposite the first surface and an edge between the first and second surfaces, wherein the second surface forms an interior volume, the light is transported within the light guide until the light exits from the first or second surface, and the solid state light source is located at the edge of the light guide in order to optically couple the light into the light guide at the edge;
a thermal guide at least partially contained within the interior volume and integrated with the light guide for providing thermal conduction from the light source for cooling the light, wherein an air gap is formed between at least a portion of the thermal guide and the second surface of the light guide;
a light sensor located within the interior volume of the light guide;
a peak detector coupled to the light sensor;
a filter coupled to the peak detector; and
a driver for providing power to the solid state light source, wherein the driver is configured to drive the solid state light source with a cyclical signal to repeatedly turn the solid state light source off and on, wherein the solid state light source is turned off and on at a rate sufficient for the light fixture to appear on,
wherein the light sensor outputs a signal related to an ambient light level when the solid state light source is off, and the light sensor saturates when the solid state light source is active and measures the ambient light level when the solid state light source is not active.

13. The light fixture of claim 12, wherein the driver directly controls a light output of the solid state light source via an output of the light sensor.

14. The light fixture of claim 12, further comprising a microcontroller coupled to the light sensor and the driver for receiving a signal from the light sensor and controlling a light output of the solid state light source via the driver and using the signal from the light sensor.

15. The light fixture of claim 12, wherein an output of the light sensor is proportional to the ambient light level.

16. The light fixture of claim 12, wherein an output of the light sensor is inversely proportional to the ambient light level.

17. The light fixture of claim 12, wherein the light sensor comprises a photodiode.

18. The light fixture of claim 12, wherein the air gap substantially surrounds the thermal guide between the thermal guide and the second surface of the light guide.

19. The light fixture of claim 12, wherein the thermal guide includes a post extending into the interior volume.

20. The light fixture of claim 19, wherein the light sensor is mounted on the post.

* * * * *